Patented July 4, 1950

2,513,999

UNITED STATES PATENT OFFICE 2,513,999

PRODUCTION OF p-NITROBENZENE SULFONAMIDO PYRIMIDINES

Charles F. Jelinek, Easton, Pa., assignor to General Aniline & Film Corporation, New York, N. Y., a corporation of Delaware No Drawing. Application December 27, 1946, Serial No. 718,893

3 Claims. (Cl. 260—239.75)

This invention relates to an improved process for the preparation of aromatic sulfonamido pyrimidines.

I have discovered that aromatic sulfonamido pyrimidines can be prepared by the reaction of acetals (including ketals) of 1,3-oxocarbonylic compounds with aromatic sulfonylguanides. This reaction of the present invention can be illustrated by the following general equation:

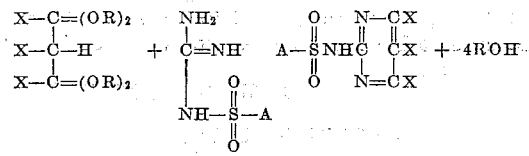

wherein X is hydrogen or hydrocarbon, R is a radical of an alcohol or phenol and A is an aromatic radical of the benzene or naphthalene series which may be substituted by radicals which are inert in the reaction (e. g. halogen, alkyl, alkoxy, nitro, etc.).

The reaction proceeds readily on heating the reactants either alone or dissolved in a liquid diluent such as a lower aliphatic monocarboxylic acid (e. g. acetic-, propionic-, butyric-acid, etc.) to a temperature within the range of 100–180° C. When the reaction is carried out in a lower aliphatic monocarboxylic acid as the solvent, the temperature employed in preferably within the range of 100–150° C., whereas when no diluent is present higher temperatures (i. e. within the range of 140–160° C.) are generally employed.

The details of the present invention will be apparent to those skilled in the art in consideration of the following specific examples:

Example 1

A mixture of 2.5 parts of p-nitrobenzenesulfonylguanidine, 10.3 parts of triethylmethyl acetal of malonaldehyde and 10 parts of glacial acetic acid were heated under reflux for 1.25 hours at 100–115° C. During the heating, 5 parts of a liquid boiling at 78–79° C. and having an odor resembling ethyl acetate was obtained. Upon cooling, a brownish solid, which separated, was filtered and then dissolved in 20 parts of dilute aqueous sodium hydroxide. The mixture was then filtered and the filtrate acidified with acetic acid. After crystallization from dilute acetic acid, there was obtained 1.3 parts of p-nitrobenzenesulfonamido pyrimidine melting at 261–263° C.

Example 2

A mixture of 2.5 parts of p-nitrobenzenesulfonylguanidine and 10.3 parts of triethylmethyl acetal of malonaldehyde was heated and stirred under reflux at 120–160° C. for 45 minutes. The reaction mixture was then filtered and the solid obtained treated with 5 parts of dilute aqueous sodium hydroxide and the suspension filtered. The filtrate was acidified with acetic acid and the product filtered. After trituration with hot C, 42.85; H, 2.88; N, 19.99. Found: C, 43.29; H, 254° C. Recrystallization yielded 0.5 part of p-nitrobenzenesulfonamido pyrimidine melting at 261–263° C. Analysis calculated for $C_{10}H_8N_4O_4S$: C, 42.85; H, 2.88; N, 19.99. Found: C, 43.29; H, 2.87; N, 19.75.

It will be apparent that the foregoing examples are illustrative only of preferred embodiments of the present invention and that the process of this invention operates effectively with a wide variety of acetals of 1,3-oxocarbonylic compounds and aromatic sulfonylguanides to produce a wide variety of aromatic sulfonamido pyrimidines, as indicated by the general equation given above. Thus, it will be apparent that by selection of an acetal of particular 1,3-oxocarbonylic compounds and selection of particular aromatic sulfonylguanides, numerous aromatic sulfonamido pyrimidines of the general formula:

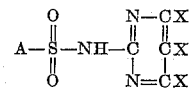

wherein A and X are as previously defined may be obtained, as indicated by the general equation given above.

Thus, in place of p-nitrobenzenesulfonylguanidine other aromatic sulfonylguanidines of the general formula:

wherein A is as defined above, can be employed in practicing the process of this invention. As examples thereof may be mentioned benzenesulfonylguanidine, 2-chlorobenzenesulfonylguanidine, 3-chlorobenzenesulfonylguanidine, 4-chlorobenzenesulfonylguanidine, 2,4-dichlorobenzenesulfonylguanidine, 2,5-dichlorobenzenesulfonylguanidine, 3,4-dichlorobenzenesulfonylguanidine, 2-bromobenzenesulfonylguanidine, 4-bromobenzenesulfonylguanidine, 2,4-dibromobenzenesulfonylguanidine, 2-bromo-5-chlorobenzenesulfonylguanidine, 2-iodobenzenesulfonylguanidine, 4-iodobenzenesulfonylguanidine, 2-nitrobenzenesulfonylguanidine, 3-nitrobenzenesulfonylguanidine, 4-chloro-2-nitrobenzenesulfonylguanidine, 2,4-dinitrobenzenesulfonylguanidine, o-, m- and p-toluenesulfonylguanidine, o-chloro-p-toluenesulfonylguanidine, m-nitro-p-toluenesulfonylguanidine, o-, m- and p-acetoxybenzenesulfonylguanidine, o-, m- and p-methoxy-benzenesulfonylguanidine, 5-chloro-2-ethoxybenzenesulfonylguanidine, 2-acetoxy-5-nitrobenzenesulfonylguanidine, 3-nitro-4-methoxybenzenesulfonylguanidine, α- and β-napthalenesulfonylguanidine, 4-chloro-naphthalenesulfonylguanidine, 5-chloronaphthalene-1-sulfonylguanidine, 5-nitronaphthalene-1-sulfonylguanidine, 1-chloronaphthalene-2-sulfonylguanidine and 4-nitronaphthalene-2-sulfonylguanidine.

In a similar manner, acetals of the type having the general formula:

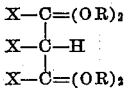

wherein X and R are as defined above can be employed in place of the triethyl methyl acetal of malonaldehyde in practicing the present invention in the manner described in the specific examples. As examples of acetals of this type may be mentioned malonaldehyde tetramethyl acetal, di-(1,3,3-triethoxy propyl)-ether, 1,1,3,3-tetramethoxy butane, 1,1,3,3-tetraethoxy heptane, 1,1,3,3-tetramethoxy-1-phenyl propane, 1,1,3,3-tetramethoxy-2-phenyl propane and 1,1,3,3-tetramethoxy-2-ethyl butane. Since an alcohol is formed as a by-product of the reaction, it is preferred, for practical reasons, to employ the lower alkyl acetals of 1,3-oxocarbonylic compounds, as indicated by the examples immediately preceding. However, the nature of the alcohol residue in the acetal employed is not critical so far as operability of the process is concerned and acetals of the type defined of 1,3-oxocarbonylic compounds with other alcohols or phenols may be employed, if desired. The acetals of 1,3-oxocarbonylic compounds which are useful in practicing the process of this invention may be prepared by reacting an orthoformic ester with an α, β-ethylenically-unsaturated ether, as described in the copending application of John W. Copenhaver, Serial No. 719,113, filed December 28, 1946.

I claim:

1. The process of producing p-nitro benzenesulfonamido pyramidines, which comprises reacting, in solution in a lower alkyl monocarboxylic acid, a tetra-lower alkyl acetal of a 1,3-oxocarbonylic compound of the formula:

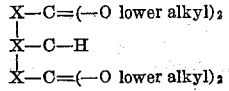

wherein X represents a member of the group consisting of hydrogen and hydrocarbon radicals, with p-nitro benzene sulfonylguanidine.

2. The process of producing p-nitro benzenesulfonamido pyrimidine, which comprises reacting, in solution in a lower alkyl monocarboxylic acid, a tetra-lower alkyl acetal of malonaldehyde with p-nitro benzenesulfonylguanidine.

3. The process as defined in claim 2 wherein the lower alkyl monocarboxylic acid specified is acetic acid.

CHARLES F. JELINEK.

REFERENCES CITED

The following references are of record in the file of this patent:

UNITED STATES PATENTS

| Number | Name | Date |
| --- | --- | --- |
| 2,435,002 | Hartmann | Jan. 27, 1948 |

Certificate of Correction

Patent No. 2,513,999                             July 4, 1950

CHARLES F. JELINEK

It is hereby certified that error appears in the printed specification of the above numbered patent requiring correction as follows:

Column 1, line 29, for the words "employed in" read *employed is*; column 2, line 9, strike out "C, 42.85; H, 2.88; N, 19.99. Found: C, 43.29; H," and insert instead *90% ethyl alcohol, the product melted at 250-*; column 4, lines 18 to 21 inclusive, for that portion of the formula reading $$\begin{matrix} x-c \\ x-c \\ x-c \end{matrix} \quad \text{read} \quad \begin{matrix} x-c \\ x-c \\ x-c \end{matrix}$$

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*